UNITED STATES PATENT OFFICE 2,173,233

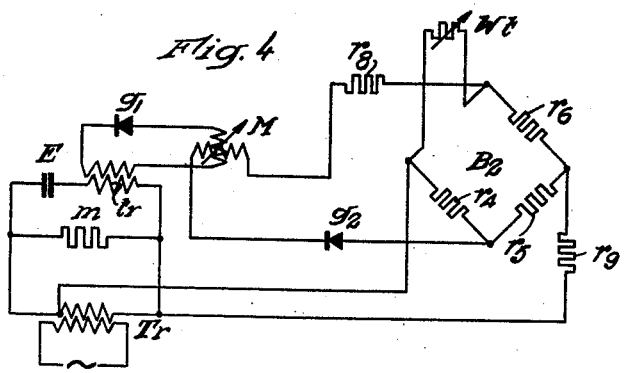
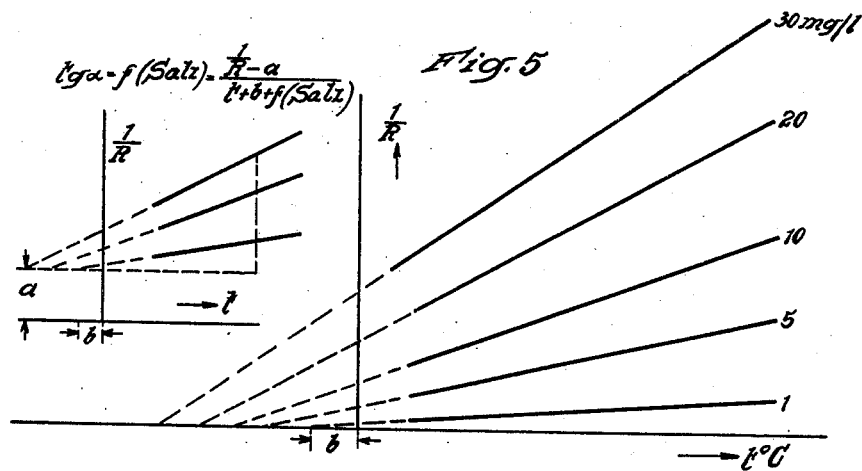
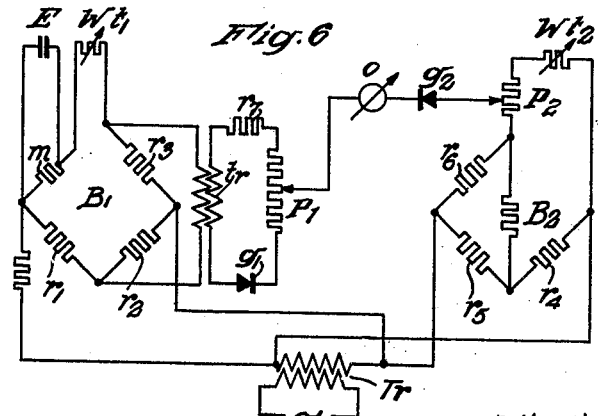

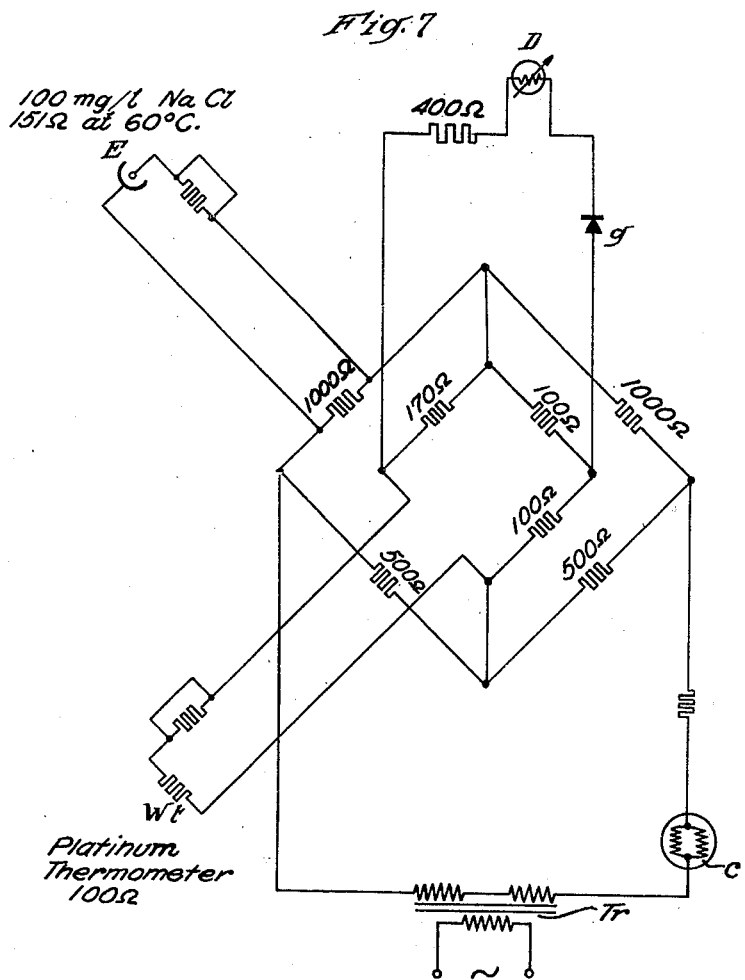

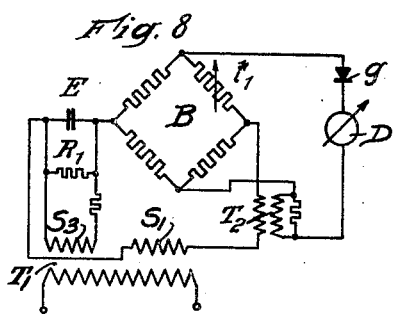
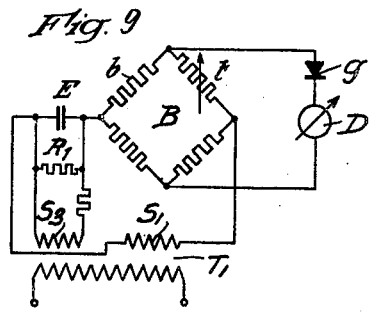
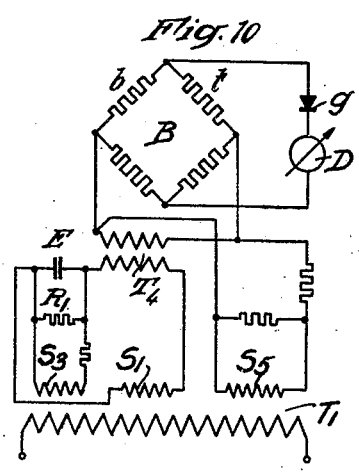
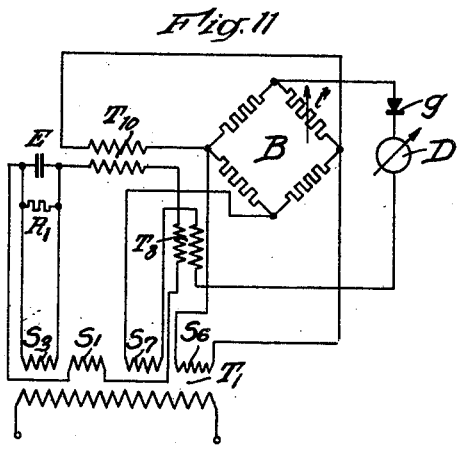
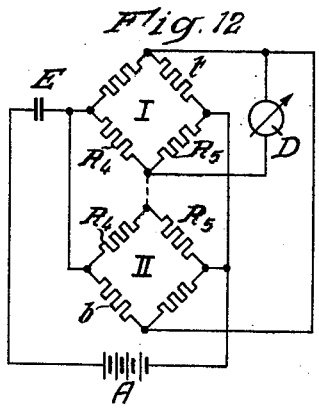
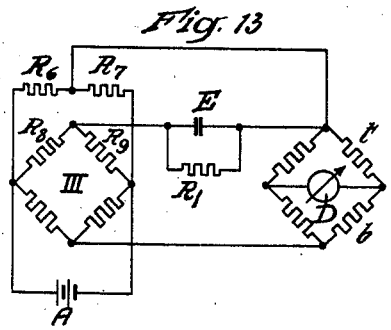

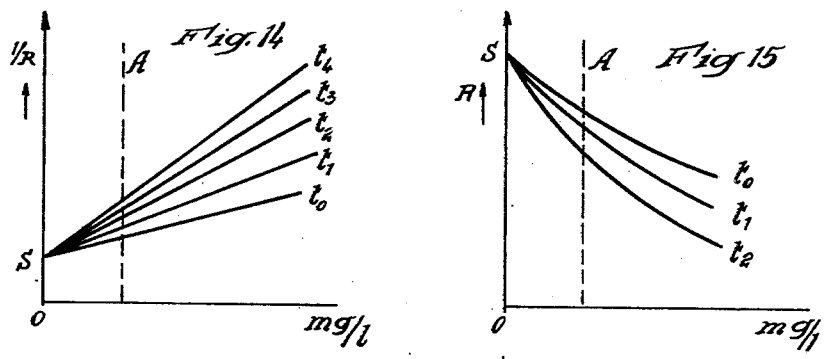
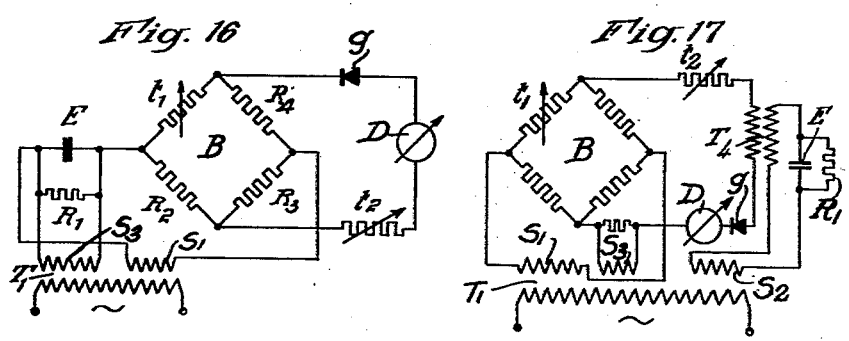
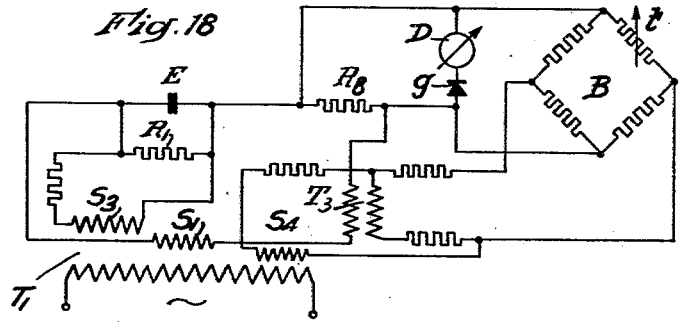
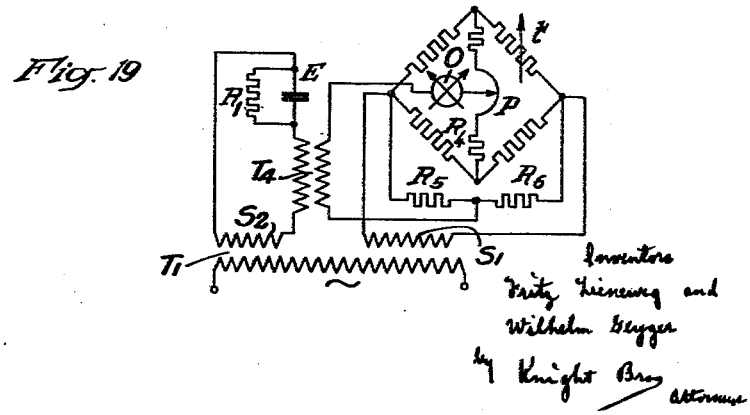

APPARATUS FOR MEASURING THE ELECTRIC CONDUCTIVITY OF LIQUIDS

Fritz Lieneweg, Berlin-Siemensstadt, and Wilhelm Geyger, Berlin-Schmargendorf, Germany, assignors to Siemens & Halske, Aktiengesellschaft, Siemensstadt, near Berlin, Germany, a corporation of Germany Application June 30, 1937, Serial No. 151,232
In Germany July 1, 1936

31 Claims. (Cl. 175—183)

Our invention relates to a method for compensating the influences of temperature when measuring the electric conductivity of liquids, particularly of salt solutions. To this end, networks have been employed for measuring the resistance of the electrolyte, only one thermometer being employed in such networks for the compensation of the influences of temperature. These known arrangements are characterized by the fact that a total compensation of temperature is attained only at the beginning of the scale and with a given salt content, whereas at the intermediate points and with a greater salt content comparatively great errors result. These errors become smaller when using another compensating circuit in which a compensation is accurately performed at two different salt percentages with the aid of two thermometers; however, in this case the compensation both at the beginning and at the end of the scale is very unsatisfactory.

A compensation of temperature influences by means of resistance thermometers arranged in a differential connection has already been proposed, which eliminates the above mentioned faults. In carrying out a measurement with this differential arrangement, the coil winding of the measuring instrument must, however, be accurately adapted to the corresponding measuring range, or special transformers must be provided for enabling a corresponding adaptation. It, therefore, is apparent that a temperature compensation heretofore could be attained only by the use of complicated arrangements.

It is an object of our invention to attain a temperature compensation over the entire range of the measuring scale while effecting the measuring of the conductivity of liquids by standard measuring devices.

According to our invention, a linear or a substantially linear approximate equation which characterizes parameter curves expressing the relation between the magnitude, for instance the salt content, to be measured with respect to the temperature, and the resistance or conductivity of the liquid between the electrodes, is represented by a measuring network, the measuring indications of which are controlled according to the equation by the resistance or the conductivity of the liquid to be tested and by one or more thermometers which are responsive to temperature variations of the liquid. More in particular, the equation underlying the measuring arrangements according to the invention, may characterize the inclination of an assembly of parameter curves of equal measuring values plotted in relation to the resistance or conductivity and the temperature of the liquid, and have the general type $$f(S) = f(R) \cdot f(t)$$

wherein S is the property to be measured, and the two terms $f(R)$ and $f(t)$ are linear or approximately linear functions of the resistance R and the temperature $t$ of the liquid. As set forth hereinafter, the equation in its actual form may represent a quotient or a product and may be modified in various ways.

In the drawings our invention is illustrated by a series of diagrams:

Figs. 1 and 2 show a graphic representation of the relation between the salt content of a liquid to be tested, the resistance R or conductivity $$\frac{1}{R}$$

and the temperature of this liquid. Each of these diagrams corresponds to a certain linear equation.

Figs. 3 and 4 illustrate the electric measuring arrangements, which, according to the invention, are designed to act, i. e. to indicate measuring results, in accordance with the equations represented by Figs. 1 and 2.

Fig. 5 shows a diagram representing another case of a curve assembly corresponding to an equation different from those of Figs. 1 and 2.

Figure 1:
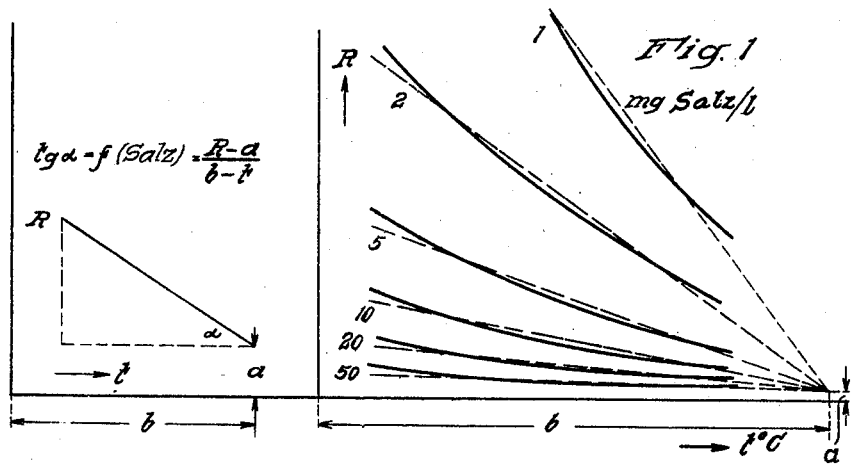

Fig. 6 exemplifies a circuit arrangement containing two interconnected Wheatstone bridges for representing the equation which corresponds to Fig. 5.

Figs. 7 through 13 illustrate other examples of circuit arrangements according to the invention.

Figs. 14 and 15 serve to explain another principal way of constructing such measuring arrangements, and Figs. 16, 17 and 18 give examples of circuits designed in accordance with this other way.

While the embodiments of Figs. 16, 17 and 18 employ direct indicating measuring instruments, Fig. 19 illustrates an example in which a similar principle is applied for performing a zero method.

As far as the different circuit arrangements shown in the drawings contain the same or similar elements, these elements are supplied with the same or with similar reference characters in order to make the similarity more apparent and to allow shortening of the description of these arrangements.

The testing method according to the invention results from the following considerations:

If, as shown in Fig. 1, lines of equal salt content are plotted in relation to the temperature $t$ and the resistance $R$ of the solution, assemblages of curves are obtained which when lengthened intersect one another substantially at one point. In practice, the inclination of these curves which approximately represent a straight line serves to determine the temperature-compensated conductivity. It results from the graphic representation shown on the left of Fig. 1:

$$f \text{ (salt content)} = \frac{R-a}{b-t}$$

where $a$ indicates the distance of the point of intersection from the axis of abscissae and $b$ the distance from the axis of ordinates. This function may be changed to the function $$f \text{ (salt content)} = \frac{R - \frac{a}{b} \cdot t}{b - t}$$

If the distance $a$ of the point of intersection from the axis of abscissae is small as compared to $b$, as is, for instance, generally the case when measuring the salt content of condensates, then $$f \text{ (salt content)} = \frac{R}{b-t}$$

According to these equations it is possible to obtain by the use of one or two resistance thermometers a compensation of the temperature with the aid of any quotient-measuring instrument employed in one of the known networks for the representation of sums or differences.

However, the representation of the salt content, when using this method, has the property not often desired that the deflection decreases with increasing values of the salt percentage in the case of standard instruments which have the zero point of its scale lying at the left, and that accordingly the smaller salt percentages are indicated at the end of the measuring range.

Figure 2:
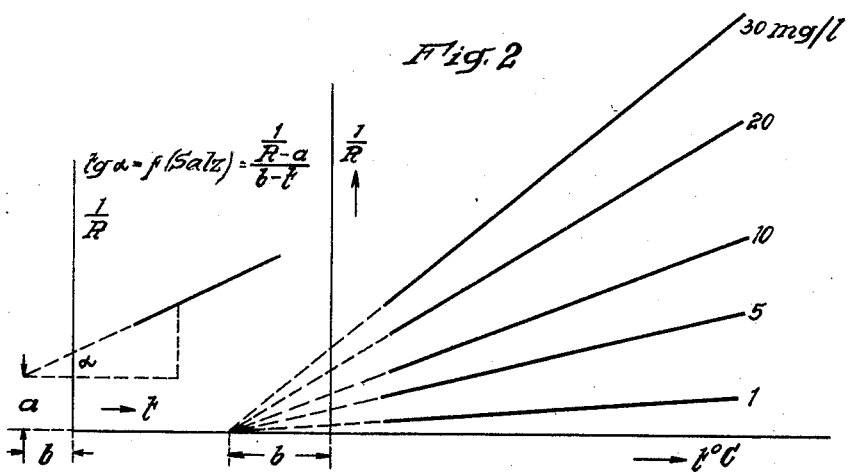

In order that the measuring range in the case of standard measuring instruments extends from the left to the right with increasing salt content, the function $$\frac{1}{R}$$

instead of the resistance $R$ is to be measured according to the invention. If lines of equal salt content are plotted as shown in Fig. 2 in relation to the temperature and the value $$\frac{1}{R}$$

then $$f \text{ (salt content)} = \frac{\frac{1}{R} - a}{b + t}$$

or changed $$f \text{ (salt content)} = \frac{\frac{1}{R} + \frac{a}{b} \cdot t}{b + t}$$

If $a$ is small as compared to $b$, then $$f \text{ (salt content)} = \frac{\frac{1}{R}}{b + t}$$

Figure 3:
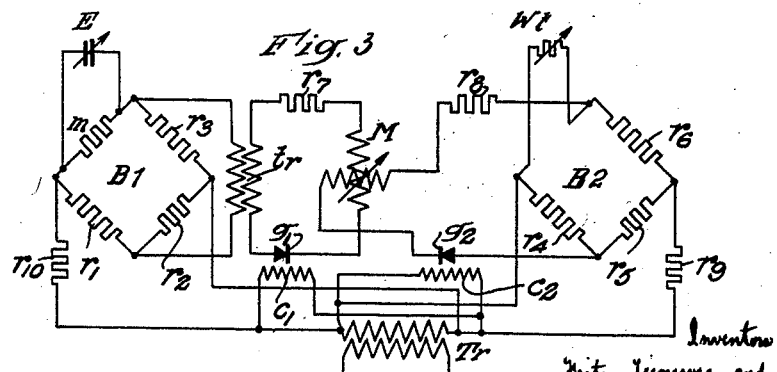

Also these and similar equations resulting from the above-mentioned method may be represented by the use of one or two resistance thermometers with the aid of any quotient-measuring instruments in known circuit arrangements for the representation of sums and differences, for instance with the aid of a quotient-measuring instrument designed as a differential galvanometer or of a bridge connection etc. The function $$\frac{1}{R} \text{ or } \frac{1}{R} - a$$

may be represented by the diagonal current in a Wheatstone bridge, for instance as illustrated in Fig. 3. In Fig. 3 the electrode vessel containing the liquid to be tested is represented by E. The electrodes are connected to a resistance $m$ of a Wheatstone bridge B1 containing in its three remaining branches the resistances $r1$, $r2$ and $r3$. Resistance $m$ may consist of a temperature-sensitive resistance serving to improve the accuracy of the measurement, as will be pointed out later.

The resistance thermometer W$t$ serving to effect the temperature compensation is connected to one branch of a second bridge circuit B2 containing the resistances $r4$, $r5$ and $r6$ in its three remaining branches.

M designates the measuring instrument for indicating the value to be measured. This instrument is of the cross-coil type. The diagonal of bridge circuit B1 is coupled through an auxiliary transformer $tr$ with a circuit connected to one coil of the measuring instrument M and containing a series resistance $r7$ and a rectifier $g1$ of the vibrating reed type. The operating magnet coil of this rectifier is designated by $c1$. The diagonal of bridge B2 is connected through a series resistance $r8$ and another rectifier $g2$ to the second coil of measuring instrument M. $c2$ is the operating magnet coil of rectifier $g2$.

A transformer T$r$, serving as current source, is connected to the two bridges B1 and B2 through series resistors $r9$ and $r10$ and to the rectifier coils $c1$ and $c2$.

The dimensioning of the network elements necessary for effecting that the diagonal current of the Wheatstone bridge represents the function $$\frac{1}{R} \text{ or } \frac{1}{R} - a$$

will become apparent from the following:—

If the resistance of the main transformer T$r$ is very small in comparison with that of the liquid between the electrodes, the voltage E may be considered constant and in accordance with Ohm's law—

$$J = \frac{\text{constant}}{R}$$

or $$f(J) = \frac{1}{R}$$

and with reference to the diagonal current of the bridge—

$$i = f\left(\frac{1}{R}\right)$$

If on the other hand the resistance of the bridge is very large with respect to the fluctuations of the resistance between the electrodes, the current intensity J may be considered constant so that—

$$\frac{E}{R} = \text{constant},$$

or $$E = \text{constant } xR,$$

or $$f(E) = R;$$

and with reference to the diagonal voltage of the bridge—

$$e = f(R)$$

The constant magnitude $a$ results from the rating of the resistances of bridge B1.

The foregoing remarks show that in the network of Fig. 3, a current is effective through auxiliary transformer $tr$ (Fig. 3) in one coil of measuring instrument M, which represents a function of either R (resistance between the electrodes) or the reciprocal value $$\frac{1}{R}$$

depending upon the choice of the resistance proportions. The second coil of instrument M is supplied by means of an identical bridge B2 with a current, which in a corresponding way is dependent upon the resistance of thermometer $Wt$ and thereby upon the temperature biasing the thermometer. The constant magnitude $b$ results from the rating of the resistances of bridge B2. The measuring instrument M indicates a value which corresponds to the quotient of the two current magnitudes supplied to the two coils; i. e. the indication represents the function $f$ (salt content) according to one of the above equations.

The above manner of dimensioning the network elements refers in principle also to the other embodiments described hereinafter, and it may be anticipated that detailed numerical data for exemplifying one of the possible ways of dimensioning the bridge resistors are indicated in Fig. 7 hereinafter described.

The function $$\frac{1}{R}$$

may also be represented according to the connection shown in Fig. 4. Here the electrode vessel E with the shunt resistor $m$ of the smallest admissible resistance is directly connected to the transformer $Tr$. The current flowing through the electrolyte is transmitted to one of the coils of the crossed-coil instrument M through a rectifier $g$ by means of a transformer $tr$. The second coil of the measuring instrument is influenced as in the arrangement according to Fig. 3 through a rectifier $g2$ by a thermometer resistance $Wt$ connected in a bridge B.

Both by the magnitude of the shunt resistor $m$ and by suitably selecting the other bridge resistances the scale characteristic of the measuring instrument may be influenced to a great extent. Also the measuring range may be selected at will as to the beginning and the end of the scale in a known manner, for instance by the selection of the bridge resistances.

While in both embodiments the bridge crossed-coil measuring mechanism is employed in connection with vibrating reed rectifiers or with dry rectifiers, also all other quotient measuring instruments or rectifiers may be employed accordingly, or the representation may be effected by means of alternating-current quotient-measuring instruments without the use of rectifiers.

It has been found that for testing the conductivity of condensates the magnitude $a$, as already mentioned, may be neglected with respect to the magnitude $b$, so that for such measurements the compensation of the temperature may be carried out with only one resistance thermometer. There is also the further advantage over the above-mentioned known compensating connections with one or two thermometers that standard resistance thermometers with, for instance 100Ω for 0° C. may be used for any measuring and temperature range. Instead of resistance thermometers with positive temperature coefficient also resistance thermometers with negative temperature coefficient, for instance, liquid resistances or resistance thermometers consisting of uranium dioxide or cuprous oxide may be employed. The temperature coefficient of such thermometers varies in accordance with the temperature. Therefore these thermometers render it possible—if necessary in connection with series or shunt resistances—to attain an additional improvement in accuracy, since the curvature of the curves is also considered in the result of the test readings.

The temperature compensation may be further improved by omitting the simplification that the curves of equal salt percentage intersect one another at one point. If, for instance, as shown in the right hand side of Fig. 5 the lines which correspond to the most favorable compensation for the individual concentrations are lengthened independently of one another to the point of intersection with the abscissa, or if the magnitude $a$ cannot be neglected with respect to $b$ as shown in the left-hand side of Fig. 5 to the point of intersection with the $a$-line running in parallel relation to the abscissa, it will be apparent that, for instance, in the simplified form $$f \text{ (salt content)} = \frac{\frac{1}{R}}{b+t}$$

the point of reference has not the same magnitude for all concentrations but is a function of the concentration, i. e.

$$f \text{ (salt content)} = \frac{\frac{1}{R}}{b + t + f \text{ (salt content)}}$$

Fig. 6 shows an arrangement in which the principle of temperature compensation is employed in connection with a double bridge circuit which instead of a quotient measuring instrument may also serve to represent the above-mentioned functions. By means of a double bridge circuit of this kind it is possible to attain an extremely accurate compensation. The network contains a double potentiometer $P_1$, $P_2$. $P_2$ is inserted in the temperature measuring bridge. $Wt_1$ and $Wt_2$ designate the thermometers, 0 a zero instrument and E the electrodes within the electrolyte to be measured. The rectifiers $g1$ and $g2$ may again be vibrating reed rectifiers or of another type. Also alternating-current zero galvanometer may be employed.

The above-mentioned example shows only one possibility of this improved compensation method. Instead of choosing the point of reference on the abscissa it may also be placed on the ordinate or on a straight line parallel thereto. The relationship between the point of reference and the concentration may be then taken into consideration, for instance, by the insertion of the second potentiometer in the bridge containing the electrolytic resistance. All of these modifications represent the general relation—

$$f(S) = \frac{f\left(\frac{1}{R}\right)}{f(t) \pm f(S)} = f(R) \cdot [f(t) \pm f(S)]$$

In Fig. 7 is shown another embodiment of the invention according to which instead of the quotient $$\frac{R}{b-t}$$

the product $$\frac{1}{R} \cdot (b-t),$$

identical therewith, is measured which, as well as the quotient, is also a function of the salt content. In the same manner all other equations to be obtained according to this method may be modified.

The arrangement of Fig. 7 is characterized by the fact that the product may be represented by a current which acts in a direct indicating one-coil galvanometer D. Therefore, ordinary moving coil galvanometers may be employed. In this case the product is preferably represented in a double bridge connection in such a manner that the current flowing from a source $Tr$ producing a current of constant intensity traverses the bridge B1 containing the electrolyte and the electrodes E, and that the diagonal current flows through the temperature measuring bridge B2. However, also all other arrangements for obtaining products may be employed. All that has been said about the quotient measuring method applies, of course also to the product method. (Use of the formulas for representing the functions, limitation of the measuring range, selection of the resistance thermometers, rectifiers, direct-current or alternating-current instruments etc.) Also the compensation method with a double potentiometer may be employed in this case for improving the compensation of the temperature. Instead of devices for maintaining the voltage or the current constant, also measuring instruments of those known types which are not influenced by voltage variations may be provided for rendering voltage fluctuations ineffective with respect to the test result.

In Fig. 7, $g$ represents a rectifier of the vibrating reed type, and $c$ its operating magnet coil. This figure, as above mentioned, also indicates a suitable selection of resistance magnitudes with respect to the resistors forming the bridges B1 and B2. The numerical examples refer to an arrangement for measuring the conductivity of NaCl solutions having a concentration between 0 to 100 milligrams per liter at temperatures betwen 30 and 100° C.

According to the invention the temperature-compensated conductivity may be represented in a simple manner by the fact that the sums or differences of the terms occurring in the equations are formed by the superposition of currents or voltages which correspond to the individual terms in such a manner that the resultant current which is proportional to the magnitude to be measured acts in only one coil of the galvanometer. This arrangement presents the further advantage that it is possible to represent in the same simple manner suppressed measuring ranges in which also the constant magnitude $a$ is to be considered. Finally, also currents which are caused by the particular type of circuit connection applied but which could affect the measurement, may be compensated for by the superposition of corresponding counter-currents.

If in the above-mentioned relations the magnitude $a$ equals zero, that means if the point of intersection of the curves coincides with the ordinate, the functions $$f(S) = \frac{\frac{1}{R}}{b+t} = R(b+t)$$

and $$f(S) = \frac{1}{R}(b-t)$$

are changed to $$f(S) = R.b + R.t$$

and $$f(S) = \frac{1}{R} \cdot b - \frac{1}{R} \cdot t$$

or in general to $$f(S) = \varphi(R).b \pm \varphi(R).t$$

Fig. 8 shows an example of a circuit designed for representing this equation. $T_1$ represents the main transformer having two secondary windings $S_1$ and $S_3$, of which winding $S_1$ forms the source of the operating current. The current flowing through the electrodes E and the bridge B is proportional to $\varphi(R)$ so that the diagonal current is proportional to $\varphi(R).t$, since a temperature-sensitive thermometer $t_1$ is inserted in the bridge. A current proportional to $b.\varphi(R)$ is superimposed upon the diagonal current through the current transformer $T_2$. The sum or difference of both currents is indicated by instrument D.

In order to give the scale the desired characteristic and to make the curves representing the relationship between the conductivity, temperature and salt content as straight as possible, it is preferable to arrange a resistance $R_1$ in parallel relation to the electrodes or in parallel to the electrode and a fixed resistance which may also be of the temperature-responsive type. If the electrode is not arranged in a suitably rated bridge but in the energy saving manner shown in Fig. 8, the basic current flowing through this resistance, for instance at a conductivity zero must be compensated for by a corresponding counter-current which in the present embodiment is produced by winding $S_3$ of transformer $T_1$. This measure is to be preferred also when using product connections according to the above-described method. Fig. 9 shows such an arrangement for the product measurement according to the equation $$f(S) = \varphi(R).[b \pm t]$$

Instead of compensating the basic current by a voltage which is applied to the shunt resistance $R_1$ the basic current may also be compensated at another point of the network.

Also for the compensation of the current there are a number of possibilities besides the arrangement shown in Fig. 8. Thus, the superposition of the current of the magnitude $b.\varphi(R)$ on the bridge may also be effected by applying the secondary winding of the transformer $T_2$ (Fig. 8) to the diagonal points of the bridge (compensation of the voltage). Or the temperature bridge is applied to the electrolytic circuit through a transformer and the current proportional to $\varphi(R).t$ is superimposed upon the electrolytic current $[b.\varphi(R)]$ by means of known voltage or current compensation connections. Under certain circumstances a transformer may be employed for each of the $\varphi(R).b$ and $\varphi(R).t$ measurements, and the currents obtained are superimposed.

If the above-mentioned constant $a$ does not equal zero, that means if the point of intersection of the curves of the measured values does not coincide with the abscissa or coordinate as was assumed for deriving the last-mentioned equations, the constant $a$ remains in the formula and characterizes the position of the point of intersection:

$$f(S) = \frac{R-a}{b-t}$$

Also this equation may be reduced and represented according to the invention. By the reduction the following equation is obtained $$f(S) = \left(\frac{1}{R} + c\right) \cdot (b-t)$$

or in general $$f(S) = [\varphi(R) + c] \cdot (b-t)$$

where $c$ is dependent upon $R$. However, as to these measurements the absolute magnitude of the value $f(S)$ may be considered great with respect to the changes caused by $R$ and, therefore, $c$ may be taken as a constant. This equation is further to be changed to $$f(S) = \varphi(R) \cdot [b \pm t] + c[b \pm t]$$

Fig. 10 shows, for instance, a network according to these equations. To the input points of the bridge B are applied through transformer $T_4$ winding $S_5$ of the transformer $T_1$ by superposition the voltages corresponding to $\varphi(R)$ and $c$, so that the bridge diagonal current is a function of the salt content, since the latter furthermore varies proportionally to $(b \pm t)$. Winding $S_3$ of transformer $T_1$ again serves to compensate the basic current flowing through $R_1$. This compensation may, however, be also effected simultaneously by $S_5$. $\varphi(R)$ may instead as shown in Fig. 10 also be represented by a bridge connection, while, as to the other elements, the arrangement remains as shown in Fig. 10.

The last equation may be further changed and represented by a circuit arrangement. The following equations are then obtained $$f(S) = \varphi(R) \cdot b \pm \varphi(R) \cdot t + c \cdot b \pm c \cdot t$$

$$f(S) = [\varphi(R) + c] \cdot b \pm [\varphi(R) \pm c] \cdot t$$

Fig. 11 shows, for instance, a network according to these equations. In this case, winding $S_3$ compensates the basic current flowing through $R_1$. The coupling transformer $T_{10}$ and winding $S_6$ of the main transformer $T_1$ produce currents proportional to $\varphi(R)$ and $c$, so that the diagonal current corresponds to $[\varphi(R) \pm c] \cdot t$ in the temperature bridge B. Owing to the superposition by the current transformer $T_8$ and the current winding $S_7$ the diagonal current may be corrected in accordance with $[\varphi(R) + c] \cdot b$. Also in this case windings $S_1$ and $S_3$ and also windings $S_6$ and $S_7$ may be combined to one transformer $T_1$, as shown in the drawings. Instead, separate transformers may be used.

Instead of effecting the superposition of currents or voltages by means of transformers also resistance compensation connections may be employed. If by the use of suitable networks equipotential points are obtained for both voltages to be superimposed, the representation may be effected by the use of a single power source. Fig. 12 shows, for instance, a bridge network for the following equation $$f(S) = \varphi(R) \cdot t + \varphi(R) \cdot b$$

A represents the current source of the network, for instance a battery. At the diagonal points of the bridge I a voltage proportional to $\varphi(R) \cdot t$ and at the diagonal points of the bridge II a voltage proportional to $\varphi(R) \cdot b$ is effective. The dotted line indicates that these bridge points have the same potential. Instead of employing two bridges as shown, the network may be simplified by omitting the resistances $R_4$ and $R_5$ of the bridge II.

In such networks it is, of course, also possible to arrange a resistance in parallel relation to the electrodes so as to obtain more accurate test readings and to influence the characteristic. Fig. 13 shows, for instance, the manner in which the basic current may be conveniently compensated for in this case. The current for the arrangement according to $$f(S) = \varphi(R) \cdot [b \pm t]$$

is supplied by a bridge III out of equilibrium. The resistances $R_6$ and $R_7$ acting in opposition to the bridge are so rated with respect to $R_8$ and $R_9$ that only the basic current is compensated for by $R_1$.

If the method according to the invention is properly carried out the above-mentioned networks may be modified in many respects depending upon the purposes in question, for instance, by omitting certain members which play no important part as to the accuracy of the measurements to be taken.

According to the invention further relations and equations may be obtained on the basis of the graphic representations of the relation between the curves of the magnitudes to be measured, the temperature of the electrolyte and its resistance, according to which relations the temperature-compensated conductivity may be determined in the manner that the resistance or the conductivity to be measured are recorded preferably as a magnitude of voltage and that by changes in inclination or by parallel displacements of the curves which result at different temperatures from the voltage as a function of the resistance or of the conductivity and of the magnitude to be determined, these curves are reduced to one curve, i. e., to a basic relationship between the voltage as a function of the resistance or of the conductivity, and the magnitude of the measured value.

To explain this method Figs. 14 and 15 show the relations which result from the conductivity and the resistance of the electrolyte, from the salt content and the temperature. The salt content in mg/1 is plotted in the diagram 14 as abscissa while the conductivity $$\frac{1}{R}$$

is plotted as ordinate. In this manner there results a group of curves, each of which corresponds to a given temperature $t_0$, $t_1$, $t_2$ etc., i. e. each curve represents an isothermal curve. These curves intersect each other at a salt content 0 at the point S which would, therefore, correspond to the point at which the measuring range of the scale begins. The diagram 15 shows a similar graphic representation in which the resistance R of the electrolyte is plotted instead of the conductivity $$\frac{1}{R}$$

in relation to the salt content. In this case a resistance is parallel-connected to the resistance $R$ of the electrolyte. By the selection of a curve of the diagram 14, for instance, of the curve corresponding to the temperature $t_0$ as curve of reference, the temperature-compensated conductivity or the salt content will be obtained independently of the temperature if the curves $t_1$, $t_2$ etc. are rotated about the point S till they coincide with the curve $t_0$. The same applies also to the measurement of the resistance according to Fig. 15.

If the measuring range does not begin with the conductivity 0 but with another value as shown by the dotted lines A in Figs. 14 and 15 then it is not possible to cause the curves to coincide with each other referred to the initial point of the scale only by changes in inclination, but in addition thereto a parallel displacement must take place. However, the curves may also be rotated about a point S lying outside the measuring range so that only one change in inclination takes place. It is often necessary also at the beginning of the measuring range with the conductivity 0 not to cause the point S to coincide with the beginning of the scale. This is above all necessary in the case of resistance measurements in the case of which the individual isothermal curves coincide only approximately if only the inclination is changed. In this case by such displacements of the point S and simultaneous parallel displacements a better coincidence may be attained.

These parallel displacements and changes in inclination may be represented by the following equation:

$$S = f(R_0) = \varphi(R) \pm a \cdot t \pm b \cdot t \cdot \Delta R_0$$

The value S, for instance the salt content, is closely related at a chosen temperature to the resistance of the solution $f(R_0)$ by the basic relation. $\varphi(R)$ represents the magnitude of the resistance or conductivity to be measured inclusive of the resistance in parallel to the electrodes, $t$ is the temperature, $a$ and $b$ are constants, $\Delta R_0$ is the distance of the corresponding measured value from the point of intersection of the curves, which point, for instance, lies at the beginning of the measuring range in the case of changes in inclination and parallel displacements and at any point in the case of changes in inclination. $a \cdot t$ represents the parallel displacement and $b \cdot t \cdot \Delta R_0$ the change in inclination.

$\varphi(R)$, the resistance or the conductivity may be represented by suitable circuits as voltage values and under certain circumstances as current values which may be influenced by further circuit elements in such a manner that $f(R_0)$ and, therefore, the temperature-compensated conductivity are recorded independently of the temperature. Some examples of arrangements for carrying out this way of embodying the invention are shown in Figs. 16, 17, 18 and 19.

In Fig. 16 a voltage produced by source S, and depending as to magnitude upon the resistance of the liquid between the electrodes E, is applied to the bridge B. If the point S about which the curves are rotated coincides with the beginning of the scale, only a change in inclination must be effected in accordance with the temperature and the deflection of the instrument. This is accomplished, for instance, by a thermometer $t_2$ with positive temperature coefficient connected in the diagonal branch of the bridge in series to the galvanometer. The thermometer varies the voltage sensitiveness of the galvanometer D. Instead of the bridge also a resistance may in this case be inserted in the circuit, to the ends of which resistance the galvanometer and the thermometer are connected.

A resistance $R_1$ is preferably connected in parallel relation to the electrode E, or in parallel relation to the electrodes and a series resistance which may be of the temperature-sensitive type in order to attain as favorable a characteristic and as accurate a compensation as possible. In this manner, on the one hand, the temperature coefficient of the arrangement is reduced and on the other hand the curves run in a considerably more straight manner in case an accurate $$\frac{1}{R}$$

measurement is not taken. However, in this case at the conductivity zero a basic current would already flow which is compensated preferably by annulling the current by a counter-voltage which in the network of Fig. 16 is supplied by winding $S_3$. The bridge itself may, however, be also rated in such a manner that the basic current is ineffective with respect to the measuring result.

If, as in the case of suppressed measuring ranges, a simultaneous parallel displacement is necessary, this displacement may be attained by a temperature-sensistive resistance inserted in one of the branches of the bridge ($t_1$ in Fig. 16).

The parallel displacement and the change in inclination may also be attained by a single resistance thermometer. To this end, the thermometer $t_2$ shown in Fig. 16 is omitted and the bridge is so rated that the thermometer $t_1$ causes, besides the parallel displacement, a change in inclination by varying the voltage at the diagonal points, since thermometer $t_1$ acts at the same time as a closing resistance for the galvanometer. Besides, in this case the sum of the resistances $t_1 + R_2$ is preferably chosen small with respect to the sum of the resistances $R_1 + R_3$.

Instead of inserting the electrodes directly in the primary circuit, they may also be inserted in a bridge, for instance in the same bridge which contains the thermometers in its diagonal branch or also in one of its branches. As thermometers resistance materials with positive or negative temperature coefficient may be employed which are to be inserted according to the effect to be attained. Consequently, a great number of modified networks are possible.

If any changes in resistance or in voltage are to be compensated with the aid of a thermometer having a small temperature coefficient, heterodyne connections are preferably employed as, for instance, shown in Figs. 17 and 18. In Fig. 17 the secondary side of the current transformer $T_4$ is impressed with a voltage proportional to the resistance or the conductivity of the liquid between the electrodes E. This voltage is in opposition to a temperature-responsive voltage taken from the bridge B which includes the thermometer $t_1$ and is fed by the winding $S_1$ of transformer $T_1$. The thermometer $t_2$ causes the change in inclination by changing the voltage sensitiveness of the galvanometer D. The basic current supplied by the resistance $R_1$ parallel-connected to the electrodes E is compensated by winding $S_3$. Also in this case $t_3$ may cause both the parallel displacement and the change in inclination.

The electrodes may be also inserted in a bridge. The arrangement according to Fig. 18 operates in this manner. In this arrangement the temperature bridge B containing the thermometer $t$ is inserted in the measuring circuit through a current transformer T₃. The transformer windings S₃ and S₄ serve to compensate the basic currents of R₁. The voltage proportional to the resistance and to the conductivity of the liquid between electrodes E is supplied to the resistor R₈. Also such networks may be modified in numerous ways.

The method explained in connection with Figs. 14 and 15 may also be applied to the compensation arrangements performing a zero method. To this end, for instance, a temperature-sensitive resistance is inserted in a branch of a bridge having a potentiometer, and a second temperature-sensitive resistance is parallel-connected to the potentiometer so that the voltage at the tapping point of the potentiometer and, therefore, the voltage which is to be opposed to the voltage corresponding to the conductivity, varies in the desired manner with the temperature. In such bridges the compensation may be also effected with the aid of a thermometer. A particularly convenient arrangement of this kind which permits to compensate any changes in conductivity with varying temperature is shown in Fig. 19. The potentiometer P is inserted in the bridge diagonal. O indicates the zero instrument. Transformer T₄ and windings S₁ and S₂ show an arrangement similar to that of the corresponding circuit elements of Fig. 17. The thermometer t indicates the desired change in inclination resulting from the change in voltage between both diagonal points. The magnitude of the parallel displacement at the beginning of the scale is dependent upon the rating of the series resistance R₄. In the bridge are arranged further the resistances R₅ and R₆ in such a manner that the basic current flowing through R₁ and, in the case of suppressed measuring ranges also the current which flows through the electrodes E at the beginning of the scale, are compensated. Also in such arrangements resistance thermometers with positive or negative temperature coefficient may be employed.

Finally, instead of the temperature also the conductivity or the resistance of the electrolyte may be plotted as parameter and the temperature as ordinate. By this graphic representation substantially the same networks as so far described may be employed, except that the thermometers are replaced by the arrangement producing the voltages proportional to the resistances and conductivities of the electrolytes, and vice versa.

We claim as our invention:

1. An arrangement for measuring the electric conductivity of liquids, particularly for measuring the salt content of solutions, comprising electrodes designed to be immersed in the liquid to be tested, a resistance thermometer for compensating the influence of temperature variations of the liquid on the measuring result, a measuring instrument, and a network representing a substantially linear approximate equation of at least two terms resulting from a mathematical representation of the relation of parameter curves of equal values of the magnitude to be measured with respect to the conductivity and the temperature, said network comprising at least two interconnected branches each being designed to produce an electric magnitude corresponding to one of said two terms respectively, one of said branches containing said electrodes, the other branch containing said resistance thermometer, said instrument being arranged in said network so as to respond to the resultant effect of said two magnitudes.

2. An arrangement for determining a property of liquids upon which the electric resistance or conductivity of the liquid is dependent, particularly for determining the salt content of solutions, comprising a pair of electrodes designed to be immersed in the liquid to be tested, at least one temperature-responsive resistance for compensating the effects of temperature variations of the liquid on the measuring result, a measuring instrument, and a network designed to represent a substantially linear aproximate equation of at least two terms expressing the relation of the magnitude [S] to be measured with respect to the resistance or conductivity [f(R)] and the temperature [t] of the liquid by characterizing the relation of parameter curves of equal values of one of said three related magnitudes to the two others, said network comprising at least two interconnected branches each being designed to produce an electric magnitude corresponding to one of said two terms respectively, one of said branches containing said electrodes, the other branch containing said temperature-responsive resistance, said instrument being arranged in said network so as to respond to the resultant effect of said two magnitudes whereby the indications effected by said arrangement correspond to the temperature-compensated value to be determined.

3. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a measuring instrument, and a network having two part-circuits and being designed to represent a substantially linear equation characterizing by a quotient the inclination of parameter curves of equal values of the property to be measured in relation to the resistance or conductivity and the temperature of the liquid, one of said part-circuits including said electrodes and being designed to represent the numerator of said quotient, said other part-circuit including said temperature-responsive resistance and being designed to represent the denominator of said quotient, said instrument being disposed in said network so as to be responsive to the effects of both of said part-circuits.

4. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a measuring instrument, and a network having two part-circuits and being designed to represent a substantially linear equation characterizing by a product the inclination of parameter curves of equal values of the property to be measured in relation to the resistance or conductivity and the temperature of the liquid, one of said part-circuits including said electrodes and being designed to represent one factor of said product, said other part circuit including said temperature-responsive resistance and representing the other factor of said product, said instrument being disposed in said network so as to be responsive to the effects of both of said part-circuits.

5. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a measuring instrument, and a network having two part-circuits and being designed to represent the equation $$f(S) = \frac{\frac{1}{R}}{b+t}$$

wherein S is the value to be measured, R the resistance of the liquid between the electrodes, $t$ the temperature and $b$ a constant value, one of said part-circuits including said electrodes and being designed to represent the numerator of the quotient of said equation, said other part-circuit including said temperature-responsive resistance and representing the denominator of said equation, said instrument being disposed in said network so as to be responsive to the effects of both of said part-circuits.

6. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a measuring instrument, and a network having two part-circuits and being designed to represent the equation $$f(S) = \frac{\frac{1}{R}}{b+t+f(S)}$$

wherein S is the value to be measured, R the resistance of the liquid between the electrodes, $t$ the temperature and $b$ a constant value, one of said part-circuits including said electrodes and being designed to represent the numerator of the quotient of said equation, said other part-circuit including said temperature-responsive resistance and representing the denominator of said equation, said instrument being disposed in said network so as to be responsive to the effects of both of said part-circuits.

7. An arrangement for determining a property of liquids upon which the electric resistance or the conductivity of the liquid is dependent, particularly for determining the salt content of solutions, comprising a pair of electrodes designed to be immersed in the liquid to be tested, at least one temperature-responsive member for compensating the effects of temperature variations of the liquid, a network comprising at least two interconnected part-circuits and being designed to represent a mathematical expression of at least two terms expressing the relation of the magnitude [S] to be measured with respect to the resistance or conductivity [$f(R)$] and the temperature [$t$] of the liquid by characterizing the relation of parameter curves of equal values of one of said three related magnitudes to the two others, one of said part-circuits containing said electrodes and being designed to produce an electric magnitude corresponding to one of said two terms, said other part-circuit containing said temperature-responsive resistance and being designed to represent an electric magnitude corresponding to said other term, a transformer connected with said network so as to form the current source of said arrangement, a direct current measuring instrument disposed in said network so as to be responsive to the effect of both of said part-circuits, and means for rectifying the current supplied to said instrument, whereby the indications of said measuring arrangement correspond to the temperature-compensated value to be measured.

8. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a measuring instrument, and a network having two interconnected bridge circuits, one of said bridge circuits containing said electrodes, said other bridge circuit containing said temperature-responsive resistance, said network being designed to represent a substantially linear equation characterizing the inclination of parameter curves of equal values of the property to be measured plotted in relation to the resistance or conductivity and the temperature of the liquid, said instrument being disposed in said network so as to be responsive to the effects of both of said bridge circuits.

9. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a two-coil quotient measuring instrument, and a network having two part-circuits and being designed to represent a substantially linear equation characterizing by a quotient the inclination of parameter curves of equal values of the property to be measured in relation to the resistance or conductivity, and the temperature of the liquid, one of said part-circuits containing said electrodes so as to represent the numerator of said quotient and being connected with one coil of said instrument, said other part-circuit containing said temperature-responsive resistance so as to represent the denominator of said quotient and being connected with the other coil of said instrument, whereby said instrument is caused to indicate the value of the quotient corresponding to the temperature-compensated property to be measured.

10. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a quotient measuring instrument having two operating coils to be energized according to the numerator and the denominator respectively of the quotient to be measured, and a network having two part-circuits and being designed to represent the inclination of parameter curves of equal values of the property to be measured in relation to the resistance or conductivity and the temperature of the liquid by a quotient having the general form $$f(S) = \frac{R-a}{b-t}$$

wherein S is the value to be measured, R the resistance of the liquid between the electrodes, $t$ the temperature, while $a$ and $b$ are constants having a positive value including the zero value, one of said part-circuits containing said electrodes so as to represent the numerator of said quotient and being connected with one coil of said instrument, said other part-circuit containing said temperature-responsive resistance so as to represent the denominator of said quotient and being connected with the other coil of said instrument, whereby said instrument is caused to indicate the temperature-compensated value of the property to be measured.

11. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a quotient measuring instrument having two operating coils to be energized according to the numerator and the denominator respectively of the quotient to be measured, and a network having two part-circuits and being designed to represent the inclination of parameter curves of equal values of the property to be measured in relation to the resistance or conductivity and the temperature of the liquid by a quotient having the general form $$f(S) = \frac{\frac{1}{R} - a}{b + t}$$

wherein S is the value to be measured, R the resistance of the liquid between the electrodes, $t$ the temperature, while $a$ and $b$ are constants having a positive value including the zero value, one of said part-circuits containing said electrodes so as to represent the numerator of said quotient and being connected with one coil of said instrument, said other part-circuit containing said temperature-responsive resistance so as to represent the denominator of said quotient and being connected with the other coil of said instrument, wherby said instrument is caused to indicate the temperature-compensated value of the property to be measured.

12. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a quotient measuring instrument having two operating coils to be energized according to the numerator and the denominator respectively of the quotient to be measured, and a network designed to represent the inclination of parameter curves of equal values of the property to be measured in relation to the resistance or conductivity, and the temperature of the liquid by a quotient of the general form $$f(S) = \frac{f(R) \pm a}{b \pm t}$$

wherein S is the value to be measured, $f(R)$ the resistance or conductivity of the liquid between the electrodes, $t$ the temperature, $a$ and $b$ constants, said network having a bridge circuit containing said electrodes designed to represent the numerator of said quotient, said bridge circuit being connected to one of the coils of said instrument, and a second bridge circuit also forming part of said network and being connected to said other coil of said instrument, said second bridge circuit containing said temperature-responsive resistance and being designed to represent the denominator of said quotient, whereby said instrument is caused to directly indicate the temperature-compensated value to be measured.

13. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a network having two part-circuits and being designed to represent a substantially linear equation characterizing by a two-term expression of quotient or product type the inclination of parameter curves of equal values of the property to be measured in relation to the resistance or conductivity, and the temperature of the liquid, one of said part-circuits including said electrodes and being designed to represent one term of said expression, said other part-circuit including said temperature-responsive resistance and representing the other term of said expression, a compensator arrangement also forming part of said network and interconnecting said two part-circuits, and a measuring instrument disposed in said compensator arrangement, whereby said compensator indicates the temperature-compensated value to be measured at zero indication of said instrument.

14. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a network having two interconnected part-circuits and being designed to represent according to an equation of the type $$f(S) = f(R) \cdot f(t)$$

wherein S is the value to be measured and the two terms $f(R)$ and $f(t)$ are linear functions of the resistance R and the temperature $t$ of the liquid respectively, the inclination of parameter curves of equal values of the property to be measured in relation to the resistance or conductivity, and the temperature of the liquid, one of said part-circuits including said electrodes and being designed to represent the term $f(R)$ of said equation, said other part-circuit including said temperature-responsive resistance and representing the term $f(t)$ of the equation, a measuring instrument disposed in said network so as to be responsive to the effects of both of said part-circuits, and a resistor connected in parallel relation to said electrodes for adapting a desired scale characteristic of said measuring instrument.

15. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a network having two interconnected part-circuits and being designed to represent according to an equation of the type $$f(S) = f(R) \cdot f(t)$$

wherein S is the value to be measured and the two terms $f(R)$ and $f(t)$ are linear functions of the resistance R and the temperature $t$ of the liquid respectively, the inclination of parameter curves of equal values of the property to be measured in relation to the resistance or conductivity, and the temperature of the liquid, one of said part-circuits including said electrodes and being designed to represent the term $f(R)$ of said equation, said other part-circuit including said temperature-responsive resistance and representing the term $f(t)$ of said equation, a measuring instrument disposed in said network so as to be responsive to the effects of both of said part-circuits, a resistor connected in parallel relation to said electrodes for adapting a desired scale characteristic of said measuring instrument, and means included in said network for compensating the effect of said resistor on the indications of said measuring instrument.

16. With a measuring arrangement according to claim 14, in combination a current source connected with said network and designed to compensate by a counter-current the effect of the basic current flowing through said resistor at zero conductivity with respect to the measuring indications.

17. In a measuring arrangement according to claim 14, said part-circuit which contains said electrodes consisting of a bridge arrangement, said electrodes and said parallel-connected resistor forming one of the four branches of said bridge, and said bridge being so balanced as to compensate the basic current flowing through said resistor at zero conductivity between said electrodes.

18. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a network having two interconnected bridge circuits and being designed to represent according to an equation of the type $$f(S) = f(R) \cdot f(t)$$

wherein S is the value to be measured and the two terms $f(R)$ and $f(t)$ are linear functions of the resistance R and the temperature $t$ of the liquid respectively, the inclination of parameter curves of equal values of the property to be measured in relation to the resistance or conductivity and the temperature of the liquid, one of said bridge circuits containing said electrodes in one of its four bridge branches so as to represent the term $f(R)$ of said equation, said other bridge circuit containing said temperature-responsive resistance in one of its four bridge branches so as to represent said term $f(t)$, a common current source connected with the feeding diagonal of each of said bridges, and a measuring instrument disposed in the interconnecting portion of said network between said two bridges so as to be subjected to the combined measuring effect of said two bridges according to said equation.

19. In a measuring arrangement according to claim 18, said measuring instrument being of the crossed-coil type and having one coil electrically coupled with the output diagonal of one of said bridges, and the other coil with the output diagonal of said other bridge.

20. In a measuring arrangement according to claim 18, said interconnecting portion of said network consisting of an adjustable compensator arrangement, and said measuring instrument being connected as zero indicator in the zero branch of said compensator arrangement.

21. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a measuring instrument, a network designed to represent a mathematical expression of at least two terms expressing the relation of the magnitude [S] to be measured with respect to the resistance or conductivity [$f(R)$] and the temperature [$t$] of the liquid by characterizing the relation of parameter curves of equal values of one of said three related magnitudes to the two others, said network having two interconnected part-circuits each being designed to produce an electric magnitude corresponding to one of said two terms respectively, one of said part-circuits containing said electrodes, the other part-circuit containing said temperature-responsive resistance, said measuring instrument being connected in said network so as to respond to the total effect caused by said two part-circuits, whereby the indications of said arrangement correspond to the temperature-compensated value to be determined.

22. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a network having two interconnected part-circuits and being designed to represent an equation of the type.

$$f(S) = f(R) \cdot [f(t) \pm f(S)]$$

wherein S is the value to be measured, $f(R)$ a function of the resistance and $f(t)$ a function of the temperature of the liquid, the inclination of parameter curves of equal values of the property to be measured in relation to the resistance or conductivity and the temperature of the liquid, one of said part-circuits including said electrodes and a second temperature-responsive resistance, said other part-circuit including said first-mentioned temperature-responsive resistance, and a measuring instrument disposed in said network so as to be responsive to the effect of both of said part-circuits whereby the indications of said measuring arrangement correspond to the temperature-compensated value to be measured.

23. In an arrangement according to claim 22, the interconnection between said two part-circuits of said network consisting of a compensator arrangement, said compensator arrangement comprising two adjustable potentiometers, each being individually connected with one of said part-circuits, and a zero branch disposed between said potentiometers, said measuring instrument being connected in said zero branch.

24. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a measuring instrument, a network designed to represent the inclination of parameter curves indicating the relation of the values to be measured with respect to the resistance or conductivity and the temperature of the liquid according to a mathematical sum expression of at least two terms, the first term being a function of the resistance of the liquid between said electrodes, the second term constituting a temperature-dependent value, and the sum of said terms corresponding to the value to be measured, said network having a measuring branch containing said instrument, a part-circuit containing said temperature-responsive resistance and connected to said measuring branch so as to impose on said branch an electric magnitude corresponding to the temperature-dependent term of said sum expression, and a second part-circuit containing said electrodes, said second part-circuit being coupled with said first part-circuit and with said measuring branch so as to impose on said branch a second magnitude corresponding to the other term of said sum expression, whereby said measuring instrument is caused to indicate the result of said superposed magnitudes.

25. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a measuring instrument, a network designed to represent the inclination of parameter curves indicating the relation of the values to be measured with respect to the resistance or conductivity and the temperature of the liquid according to an equation of the type $$f(S) = \varphi(R) \cdot b \pm \varphi(R) \cdot t$$

wherein S is the value to be measured, $\varphi(R)$ a function of the resistance R between the electrodes, $t$ the temperature of the liquid and $b$ a constant, said network having a measuring branch containing said instrument, a part-circuit containing said temperature-responsive resistance and connected to said measuring branch so as to impose on said branch an electric magnitude corresponding to the temperature-dependent term of said equation, and a second part-circuit containing said electrodes, said second part-circuit being coupled with said first part-circuit and with said measuring branch so as to impose on said branch a second magnitude corresponding to the other term of said equation, whereby said measuring instrument is caused to indicate the resulting value of said superimposed magnitudes corresponding with the temperature-compensated value to be measured.

26. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a measuring instrument, a network designed to represent the inclination of parameter curves indicating the relation of the values to be measured with respect to the resistance or conductivity and the temperature of the liquid according to an equation of the type $$f(S) = \varphi(R) \cdot b \pm \varphi(R) \cdot t \pm c \cdot t + c \cdot b$$
$$= [\varphi(R) + c] \cdot b \pm [\varphi(R) \pm c] \cdot t$$

wherein S is the value to be measured, $\varphi(R)$ a function of the resistance between the electrodes, $t$ the temperature of the liquid, $b$ a constant and $c$ a corrective, preferably a constant factor, said network having a measuring branch containing said instrument and at least two part-circuits coupled with each other and with said measuring branch and designed to superpose in said branch electric magnitudes corresponding to the individual terms of said equation so that said instrument indicates the temperature-compensated value to be measured as the result of the superposition, one of said part-circuits containing said electrodes in order to produce the resistance-dependence, and said other part-circuit containing said temperature-responsive resistance in order to produce the temperature-dependence of said superposed magnitudes.

27. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a measuring instrument, a network designed to represent the inclination of parameter curves indicating the relation of the values to be measured with respect to the resistance or conductivity and the temperature of the liquid according to a mathematical sum expression of at least two terms, the first term being a function of the resistance of the liquid between said electrodes, the second term constituting a temperature-dependent value, and the sum of said terms corresponding to the value to be measured, said network comprising in combination a bridge circuit having said measuring instrument connected in the bridge measuring diagonal and said temperature-responsive resistance connected in one of its four bridge branches, a part-circuit containing said electrodes and a current source and being coupled with the feeding diagonal of said bridge so as to supply said bridge with a current magnitude dependent upon the resistance of the liquid between said electrodes, whereby said bridge imposes on said measuring diagonal a magnitude dependent upon said resistance as well as on the temperature of the liquid, and an electric coupling disposed between said part-circuit and said measuring diagonal so as to superpose on said measuring diagonal a second magnitude dependent upon the resistance of said liquid, whereby said measuring instrument is caused to indicate the temperature-compensated value to be measured.

28. An arrangement for determining a property of liquids upon which the electric resistance or the conductivity of the liquid is dependent, particularly for determining the salt content of solutions, comprising a pair of electrodes designed to be immersed in the liquid to be tested, a temperature-responsive resistance for compensating the effects of temperature variations of the liquid on the measuring result, a measuring instrument, a network designed to represent the inclination of parameter curves indicating the relation of the values to be measured with respect to the resistance or conductivity and the temperature of the liquid according to a mathematical sum expression of at least two terms, the first term being a function of the resistance of the liquid between said electrodes, the second term constituting a temperature-dependent value, and the sum of said terms corresponding to the value to be measured, said network comprising in combination a bridge circuit having said measuring instrument connected in the bridge measuring diagonal and said temperature-responsive resistance connected in one of its four bridge branches, a main transformer forming the current source of the network, a part-circuit containing said electrodes and being connected with said main transformer, a coupling transformer having its primary winding connected in said part-circuit and its secondary winding connected with the feeding diagonal of said bridge so as to supply said bridge with a current magnitude dependent upon the resistance of the liquid between said electrodes, whereby said bridge imposes on said measuring diagonal a magnitude dependent upon said resistance as well as on the temperature of the liquid, and a second coupling transformer having its primary winding connected in said part-circuit and its secondary winding connected in said measuring diagonal so as to superpose on said measuring diagonal a second magnitude dependent upon the resistance of said liquid, whereby said measuring instrument is caused to indicate the temperature-compensated value to be measured.

29. With an arrangement according to claim 27, in combination, a resistor connected in parallel relation to said electrodes for adapting the scale characteristic of said measuring instrument, and an auxiliary current source connected with said network for compensating with respect to said measuring instrument the effect of the basic current flowing through said resistor at zero conductivity between said electrodes.

30. With an arrangement according to claim 26, wherein further the aforesaid part-circuit containing the aforesaid temperature-responsive resistance consists of a bridge circuit, and the aforesaid branch containing the aforesaid measuring instrument forms the measuring diagonal of said bridge circuit, in combination, a coupling transformer having its primary winding connected in said part-circuit and its secondary winding connected with the feeding diagonal of said bridge so as to supply said bridge with a current magnitude dependent upon the resistance of the liquid between said electrodes, a second coupling transformer having its primary winding connected in said part-circuit and its secondary winding connected in said measuring diagonal so as to superpose on said measuring diagonal a second magnitude dependent upon the resistance of said liquid, and a main transformer having a plurality of secondary windings, one of said windings being connected in said part-circuit containing said electrodes and forming the current source of said part-circuit, a second of said windings being connected with the feeding diagonal of said bridge so as to supply to said bridge a constant magnitude representing the effect of member c of the aforesaid equation, and a third of said windings being connected in said measuring diagonal of said bridge for superposing a constant magnitude, whereby said measuring instrument is caused to indicate the temperature-compensated value to be measured.

31. With an arrangement according to claim 26, wherein further the aforesaid part-circuit containing the aforesaid temperature-responsive resistance consists of a bridge circuit, and the aforesaid branch containing the aforesaid measuring instrument forms the measuring diagonal of said bridge circuit, in combination, a coupling transformer having its primary winding connected in said part-circuit and its secondary winding connected with the feeding diagonal of said bridge, a second coupling transformer having its primary winding connected in said part-circuit and its secondary winding connected in said measuring diagonal, a resistor connected in parallel relation to said electrodes for adapting the scale characteristic of said measuring instrument, and a main transformer having four secondary windings, one of said windings being connected in said part-circuit containing said electrodes and forming the current source of said part-circuit, a second of said windings being connected with the feeding diagonal of said bridge so as to supply to said bridge a constant magnitude representing the effect of member c of the aforesaid equation, a third of said windings being connected in said measuring diagonal of said bridge for superposing a constant magnitude, and the last of said windings being connected with said part-circuit containing said electrodes so as to compensate the basic current of said adapting resistor, whereby said measuring instrument is caused to indicate the temperature-compensated value to be measured.

FRITZ LIENEWEG.
WILHELM GEYGER.